Sept. 21, 1965 K. G. AHLÉN 3,207,279

FLUID AND MECHANICAL CLUTCHES

Filed Oct. 26, 1960 9 Sheets-Sheet 1

INVENTOR.
KARL GUSTAV AHLEN
BY
Larson and Taylor

Sept. 21, 1965  K. G. ÅHLÉN  3,207,279
FLUID AND MECHANICAL CLUTCHES
Filed Oct. 26, 1960  9 Sheets-Sheet 3

INVENTOR.
KARL GUSTAV AHLEN
BY
Larson and Taylor

INVENTOR.
KARL GUSTAV AHLEN

INVENTOR.
KARL GUSTAV AHLEN
BY

3,207,279
FLUID AND MECHANICAL CLUTCHES
Karl Gustav Åhlén, Stockholm, Sweden, assignor to
Svenska Rotor Maskiner Aktiebolag, Stockholm,
Sweden, a company
Filed Oct. 26, 1960, Ser. No. 65,058
Claims priority, application Sweden, Oct. 30, 1959,
10,138/59
16 Claims. (Cl. 192—57)

This invention relates to a power transmission mechanism for connecting input and output shafts, which mechanism comprises a hydrostatic coupling and at least one clutch arranged in series with said hydrostatic coupling.

In using a hydrostatic coupling a problem arises in connection with interrupting the torque transmission through the coupling. The simple expedient of opening the maximum pressure valve so that the pumps can act unrestrictedly without any counter-pressure is in fact not sufficient for disengagement of the coupling. Owing to the friction forces transmitted through the fluid between the relatively rotating coupling parts, the driven part of the coupling will be caused to rotate resulting in appreciable torque transmission. A complete disconnection of the coupling can not, therefore, be brought about in this way.

In order to make such a complete disconnection possible the power transmission mechanism according to the invention has been provided with a mechanical clutch which is connected in series with the hydrostatic coupling. This clutch is adapted to be controlled by pressure liquid from the hydrostatic coupling. In this way the clutch can be operated or controlled without any outside power source except the torque of the driving shaft. The control can thus be accomplished with a simple control impulse.

An expedient way to design the control device for controlling the mechanical clutch by pressure fluid from the hydrostatic coupling is to provide the mechanical clutch with a servo motor which is adapted to be connected by a valve alternatively with the pressure side or with the suction side of the hydrostatic coupling. In this way the valve is the only means that must be actuated for control of the clutch.

With regard to utilizing the control valve in connection with several pump units in the hydrostatic coupling it is advantageous to locate the valve coaxial with the axis of the coupling and to make it axially slidable.

In order to facilitate the operation of the valve it is desirable to provide a balanced structure in which the pressure of the fluid is approximately the same in both directions. For the actuation of the valve it is further desirable to use an actuating device which must produce only a very small force to displace the valve from one end position to the other. The actuating device may take several different forms.

A power transmission of the type under consideration may consequently be used for several different purposes when it is desirable to limit the maximum transmitted torque and to effectively absorb the vibrations in the device as well as to selectively cut off the torque transmission. Several possible uses will be mentioned below in connnection with the different embodiments.

By a suitable dimensioning of the mechanical clutch in relation to the hydrostatic coupling slip between the different parts of the clutch may be eliminated, the only slip occurring between the different parts of the hydrostatic coupling. As a matter of fact substantially all wear of the clutch may be eliminated in this way. For this reason a friction clutch combined with a hydrostatic coupling as mentioned above may be used for transmission of a greater torque than is feasible with a friction clutch of the same size in which slippage occurs between the parts of the friction clutch.

Owing to the fact that the clutch is held engaged by means of the liquid on the high pressure side of the hydrostatic coupling this engagement will cease when the pressure on the pressure side of the hydrostatic coupling decreases to or beneath the pressure on the suction side. Such a decrease will occur at a relative rotation between the parts of the hydrostatic coupling opposite to the normal one, i.e. when the input shaft is driven from the output shaft. The power transmission is thus acting as a free-wheel device and for this action it must not be provided with a displaceable valve.

The power transmission may also be provided with at least two selectively engageable clutches in series with the hydrostatic coupling as well as with a number of output shafts corresponding to the number of clutches. In this way it is further attained that by displacement of the control valve the control of the clutches is carried out by power taken from the hydrostatic coupling and in this way from the driving shaft and upon an increase in load resulting from engagement of another clutch slip and wear of the clutches is prevented since the engaging pressure is in proportion to the torque transmitted through the hydrostatic coupling.

Further the actuating means for displacement of the control valve adapted to connect the servo-motor of the clutch with the pressure and the suction sides, respectively, of the hydrostatic coupling may take the form of a hydraulically operated piston. This involves several advantages. Thus the piston can be directly connnected with the valve. Further the piston can be adjustable in several steps by means of different pressures of the operating liquid. Especially at a step corresponding to a high operating liquid pressure the connection between the servo-motor of the clutch and the hydrostatic coupling can be interrupted by the simultaneous supply of high pressure liquid from a outside source to the servo-motor as well as to the suction side of the hydrostatic coupling. In this way the clutch is engaged independent of the direction of the torque transmission and simultaneously the pressure on the suction side of the hydrostatic coupling is higher than on the pressure side so that the hydrostatic coupling also transmits torque in a direction opposite to the normal one. In other words the free-wheel effect of the power transmission is eliminated.

In the following part of the specification several suitable embodiments will be shown in detail in connection with the drawings in which.

Figure 1:
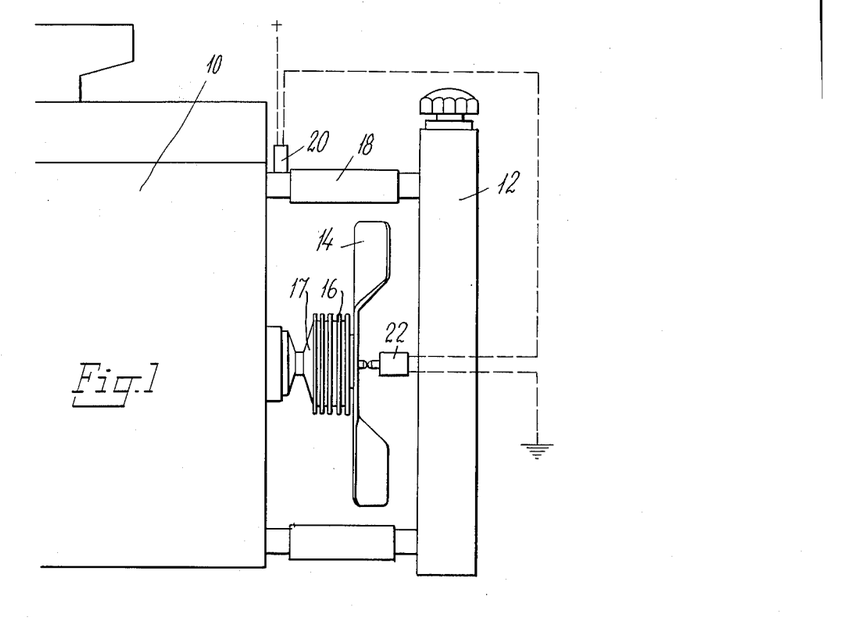
FIG. 1 is a schematic view of an installation of the invention.

In FIG. 1, 10 is a combustion engine with a cooler 12 and a cooling fan 14 located on a power transmission casing 16, 17. In the pipe 18 between the cooler 12 and the engine 10 a thermostat 20 is located which controls the operation of a solenoid 22 coaxial with the fan.

Figure 2:
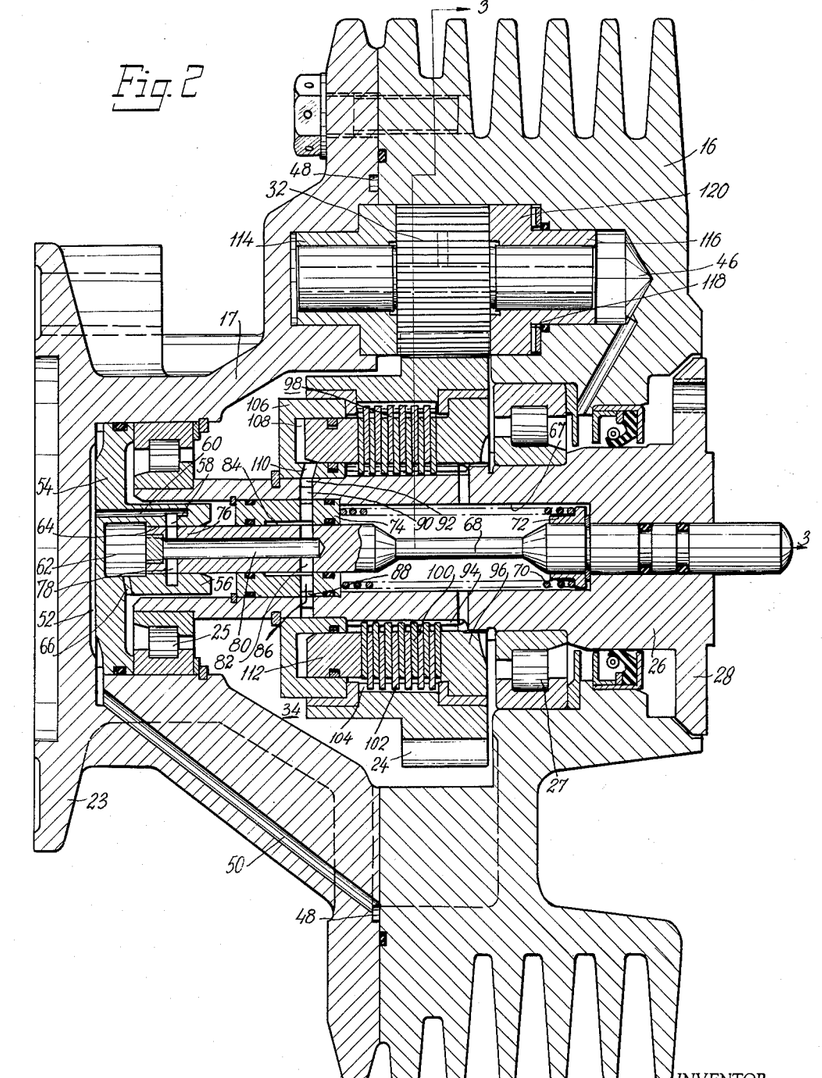
FIG. 2 is a longitudinal section along the line 2—2 in FIG. 3 through an embodiment of the invention.
Figure 3:
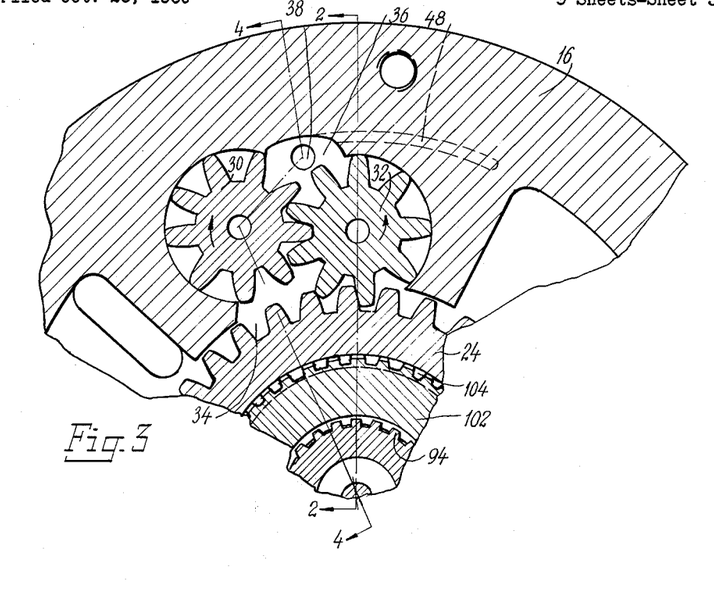
FIG. 3 is a transverse section along line 3—3 in FIG. 2.
Figure 4:
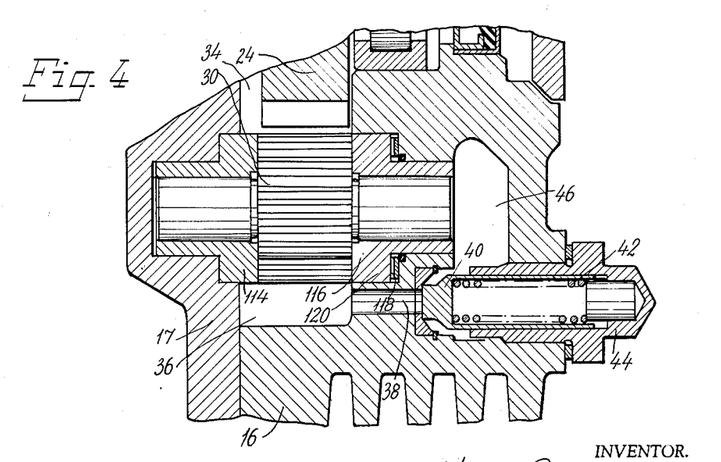
FIG. 4 is a longitudinal section along the line 4—4 in FIG. 3.

As shown in FIGS. 2–4 the power transmission casing 16, 17 is provided with a flange 23 for connection with a shaft of the engine 10 and encloses a hydrostatic coupling comprising the casing or first member 16, 17 and a central gear or second member 24 coaxial with the casing, which gear is disengageably connected with a shaft 26 journalled in the casing 16, 17 by means of the roller bearings 25, 27. Said shaft is provided with a flange 28 to which the fan 14 shown in FIG. 1 can be attached. In the casing 16 several gears 30, 32 are journalled in pairs which intermesh with each other with one gear 32 of each pair meshing with the central gear 24.

The pair of gears 30, 32 work as a gear pump for moving liquid from an inner low pressure chamber 34 to an outer high pressure chamber 36. Said high pressure chamber is connected through a channel 38 with a maximum pressure valve 40. Said valve is located in such a way that it is slidable in parallel with the axis of the power transmission so that the influence of the centrifugal forces is eliminated. The pressure at which valve 40 will open can be adjusted by varying the tension of the spring 42 by means of the part 44 which is threadedly mounted in the casing 16. The liquid passing the valve 40 is conducted to a chamber 46 communicating with the low pressure chamber 34.

The high pressure chamber 36 is furthermore connected through channels 48, 50 with a chamber 52 located at the end of the casing portion 17 which is adjacent to the flange 23. Said chamber is closed by means of a plate-like member 54 fixed to and sealing against the casing. Said member 54 is provided with a hollow stud 56 on the opposite side from the chamber 52 and having an inner surface provided with an annular groove 58. Said groove 58 communicates by at least one channel 60 with the chamber 52. The cavity 62 at the inner end of the hollow stud 56 has a diameter which is a little bigger than the diameter of the portion 64 of said cavity in which said annular groove 58 is located. The cavity 62 communicates with the low pressure chamber 34 by means of channels 66 through the wall of the stud 56.

The shaft 26 is provided with an axial bore 67 from one end to the other. In said bore an axially slidable valve 68 is located displaceable in one direction by the solenoid 22 shown in FIG. 1 and in the other direction by a spring 70 which abuts against a bushing 74 axially fixed in the shaft 26. The end portion 76 of valve 68 opposite to the solenoid 22 is slidable in the cavity 64 of the stud 56. Said portion 76 is provided with a number of radial bores 78. Said bores 78 communicate with one end of an elongated closed chamber 80 in the portion 76 of the valve 68 which chamber 80 at its other end communicates with the exterior of the valve 68 by means of radial bores 82.

The bushing 74 located inside the shaft 26 seals against the inner surface of the shaft 26 as well as against the outer surface of the portion 76 of the valve 68 and is provided with an elongated annular groove 84. A number of radial bores 86 in the bushing 74 communicates with the annular groove 84. Said bores 86 communicate with an annular groove 88 in the outer surface of bushing 74. A number of radial bores 90 extend through the shaft 26 in the plane of the bores 86 and the annular groove 88. Said bores 90 communicate with an annular groove 92 in the outer surface of shaft 26.

The shaft 26 is provided with splines 94, A hub part 96 of the gear 24 is fixed on the shaft 26. Said hub part 96 forms a reaction member for a disk clutch 98 between the gear 24 and the shaft 26. A set of clutch disks 100 are non-rotatably and slidably located on said splines 94. Between said clutch disks 100 another set of clutch disks 102 are located which are non-rotatably and slidably mounted on internal splines 104 of the gear 24.

A ring-shaped element 106 is axially fixed on the shaft 26 and provided with an axially directed annular cylinder 108. The bottom of the cylinder 108 communicates by a number of radial bores 110 with the annular groove 92 in the shaft 26. An annular piston 112 is slidably mounted for axial movement in the cylinder 108.

The gear 24 is rotatably journalled on the hub part 96 and on the ring-shaped element 106.

The gears 30, 32 are journalled in bushings 114, 116. The bushing 114 is fixed against movement in an axial direction while the bushing 116 is axially adjusable as the chamber 118 between the flange 120 of the bushing 116 and the casing 16 communicates with the high pressure chamber 36. In this way the bushing 116 is pressed into sealing contact with the gear 30, 32 which in turn is pressed into sealing contact with the bushing 114. In this way leakage losses in the gear pump are decreased and consequently the slip between the casing 16, 17 and the shaft 26 is also decreased.

A device as shown in FIG. 1 operates in the following way. At start of the engine 10 the cooling liquid is cold so that the thermostat 20 acts upon the solenoid 22 in such a way that it moves the valve 68 to the left in FIG. 2 to a position in which the bores 78 communicate with the cavity 62. In this way the cylinder 108 communicates with the low pressure chamber 34 by means of 110, 92, 90, 88, 86, 84, 82, 80, 78, 62 and 66, i.e. the clutch 98 is disengaged. With the clutch 98 disengaged no torque is transmitted from the gear 24 to the shaft 26 and the fan 14 is standing still. Owing to the fact that no torque is absorbed from the gear 24 by the clutch 98 said gear is rotating at almost the same speed as the casing 16, 17 which is driven from the engine. The pump gears 30, 32 are, therefore, rotating at a low speed and the pressure in the high pressure chamber 36 is only slightly higher than the pressure in the low pressure chamber 34.

When the engine has been running for a sufficient period to raise the temperature of the cooling liquid to a predetermined working temperature to which the thermostat 20 has been adjusted the thermostat will energize the solenoid 22 to permit reverse movement of the valve 68. The valve is then displaced to the right in FIG. 2 by the spring 70 so that the bores 78 are brought into the plane of the annular groove 58. In this way the high pressure chamber 36 communicates with the cylinder 108 by means of 48, 50, 52, 60, 58, 78, 80, 82, 84, 86, 88, 90, 92 and 110. By this communication the annular piston 112 is displaced to the right under the influence of the pressure difference between the high pressure and the low pressure chambers 36 and 34 and the clutch 98 is engaged. As a result, torque transmission occurs from the gear 24 through the clutch 98 and the shaft 26 to the fan 14. In this way the fan 14 will be accelerated while the gear 24 will be decelerated. Thus the difference between the speeds of the casing 16, 17 and the gear 24 is increased so that the pump gears 30, 32 rotate faster and the pressure in the high pressure chamber 36 increases. In this way the pressure in the cylinder 108 is also increased and the engaging pressure of the clutch 98 increases. When the pressure in the high pressure chamber 36 reaches the pressure to which the maximum pressure valve 40 is adjusted said valve will open and the synchronization between the casing 16, 17 and the fan 14 is maintained by the hydrostatic coupling without any slip in the disk clutch 98 thereby substantially eliminating clutch wear.

When the acceleration of the fan 14 has ceased it will rotate with almost the same speed as that of the casing 16, 17 while the pump gears 30, 32 rotate only as much as is necessary to compensate for leakage losses owing to the pressure difference between the high pressure chamber 36 and the low pressure chamber 34. Said pressure difference is a function of the transmitted torque.

When the speed of the engine increases the power absorbed by the fan will increase as will the torque transmitted through the power transmission. At a predetermined speed determined by adjustment of the maximum pressure valve 40 said valve will open and the pump gears 30, 32 will begin to rotate. As a result the speed of the gear 24 and the fan 14 increases only slightly at higher speeds of the engine and the casing 16, 17. The speed of the fan will thus increase only slightly as engine speed increases above the predetermined speed which is advantageous in that the cooling requirements of the engine increase only slightly at speeds above a speed corresponding to approximately 80% of the maximum speed of the engine. The cooling of the engine at high speeds will thus be quite sufficient and at the same time a considerable saving of fan power requires to drive the fan is obtained at high engine speeds. As the power required to drive the fan is proportional to the third power of the speed a power saving of almost 50% is obtained if the fan has a speed corresponding to only 80% of the maximal engine speed when the engine is operating at its maximal speed.

If the speed of the engine is decreased below beneath the predetermined speed, the torque absorbed by the fan will also decrease so that the maximum pressure valve 40 will once more be closed, the speed of the pump gears 30, 32 will decrease and the speed ratio between the fan 14 and the casing 16, 17 will once more increase to nearly 1.

If the temperature of the cooling liquid of the engine decreases below beneath the temperature fixed by the thermostat 20 the disk clutch 98 will once more be disengaged by means of the solenoid 22 and the valve 68 as set forth above until the temperature has again increased to the temperature setting of the thermostat 20.

When the engine is stopped the valve 68 will remain in the position for engaging the disk clutch 98 until the temperature of the cooling liquid has decreased beneath the predetermined temperature whereupon the valve 68 is moved by the solenoid 22 to a position for disengaging the clutch 98. On the assumption, however, that the electric source of power for energizing the solenoid has been cut off the valve 68 remains in position for engaging the disk clutch 98 and will be displaced from that position when the electric source of power is again turned on.

Figure 5:
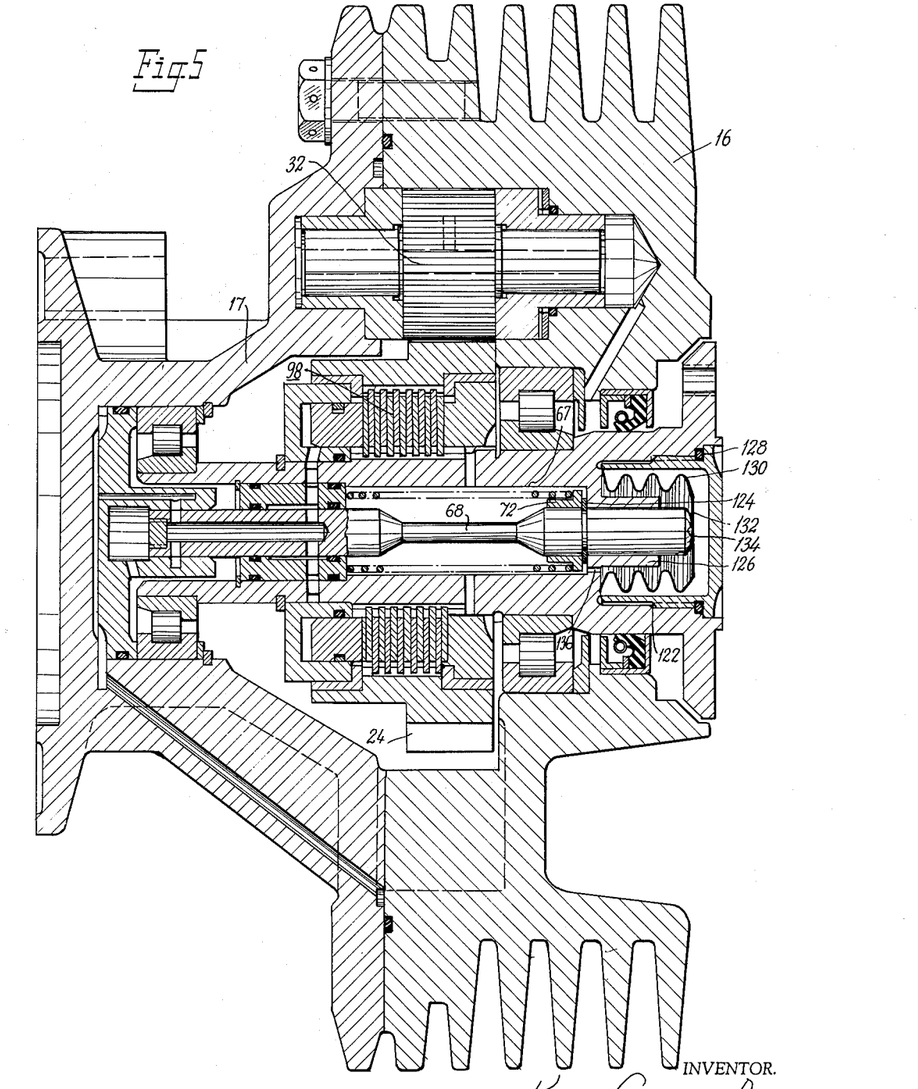
FIG. 5 is a longitudinal section similar to FIG. 2 through another embodiment of the invention.

In FIG. 5 an alternative embodiment of the power transmission is shown. Corresponding parts designated by the same numerals in FIG. 5 as in FIG. 2. The only change in relation to the embodiment of FIG. 2 is that the device for actuating the valve 68 is provided as an integral part of the power transmission rather than as a reparate element as in FIG. 2.

The shaft 26 is provided with an axial bore 122 which by means of an intermediate wall 124 is separated from the bore 67. The intermediate wall 124 supports a hollow stud 126 which acts as a guide for the valve 68. The intermediate wall acts furthermore as a stop for the flange 72 of the valve 68. In the bore 122 is disposed a thermostat in the form of a rigid outer case 128 closed at its outwardly directed end and in the case 128 is disposed bellow-shaped inner case 130 that is provided with a rigid bottom 132 adapted to engage and cooperate with the end 134 of the vlave 68. The cases 128 and 130 are connected with each other in a liquid-tight and gaseous-tight manner. The closed chamber provided by this structure is partly filled with a liquid that is chosen in such a way that the liquid has a boiling point which is somewhat beneath the temperature of the shaft 26 and of the working fluid in the bore 122 at which release of the disk clutch is accomplished. A number of holes 136 are provided through the intermediate wall 124 which holes connect the bores 67 and 122 so that working fluid can pass into and out of the bore 122 when the bottom 132 of the bellows changes its position.

Thus control of the power transmission is provided by this embodiment which is entirely automatic and independent of any outside power source.

Figure 6:
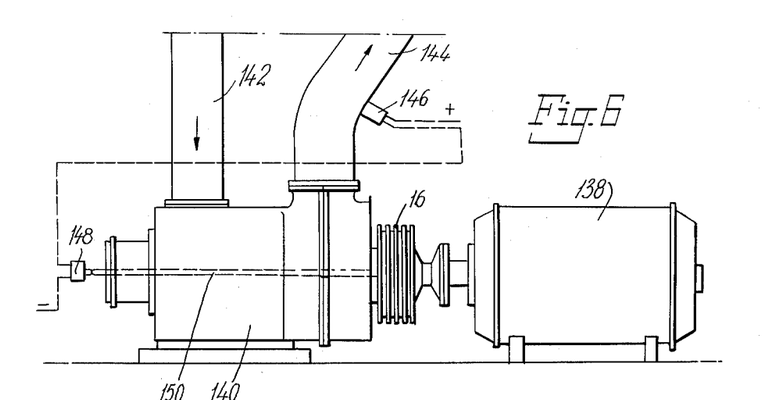
FIGS. 6–8 are schematic views of other installations of the invention.

In FIG. 6 an electric motor 138 and a compressor 140 driven by said motor by means of a power transmission 16 according to the invention are shown. The compressor 140 is provided with an inlet conduit 142 and an outlet conduit 144. A device 146 sensitive to the temperature or the pressure in the outlet conduit 144 is located in said conduit. Said temperature or pressure sensitive device 146 may control an electric solenoid 148 which is coaxial with the axis of the power transmission and which actuates the valve of the power transmission by means of a push rod 150 extending through the compressor 140.

Figure 7:
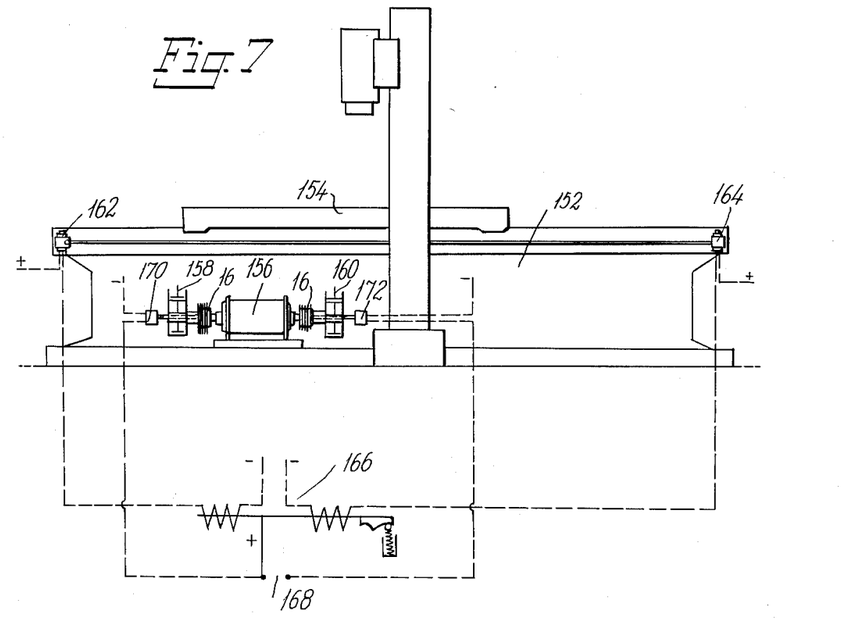

A machine tool such as a planing machine 152 is shown in FIG. 7. Said machine is provided with a reciprocating bed 154. An electric motor 156 for driving the bed 154 is provided with two separate gear devices 158, 160 for drive of the bed 154 in either direction. Each of the gear devices 158, 160 is connected with the motor 156 by means of a power transmission 16 according to the invention. For control of power transmissions 16 the planing machine 152 is provided with end limit switches 162, 164 for the bed 154. Said switches control a relay 166 that operates a switch 168 which closes the circuit alternatively through two solenoids 170, 172 each serving to control the operation of a power transmission 16.

Figure 8:
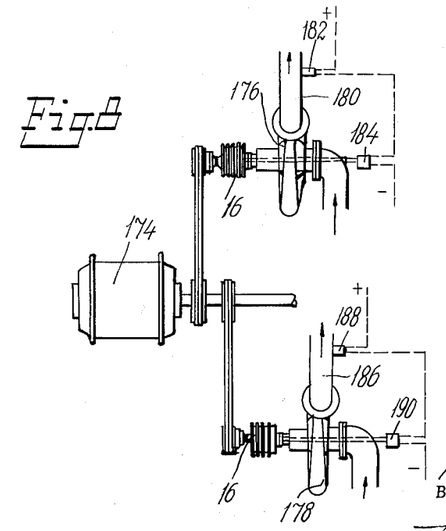

An electric motor 174 provided to drive two separate pumps 176, 178 by separate power transmissions 16 according to the invention is shown in FIG. 8. The pump 176 is provided with a device 182 sensitive to the temperature and located in the outlet conduit 180 of said pump. Said device 182 controls an electric solenoid 184 for actuating the valve of the power transmission 16 for the pump 176. The pump 178 is provided with a device 188 sensitive to pressure and located in the outlet conduit 186 of said pump. Said device 188 controls an electric solenoid 190 for actuating the valve of the power transmission 16 for the pump 178. Such a pump arrangement is useful in a closed circulation system where the pump 176 maintains the circulation and where the pump 178 serves as a feeder pump in order to maintain the quantity of liquid constant in the circulation system.

Figure 9:
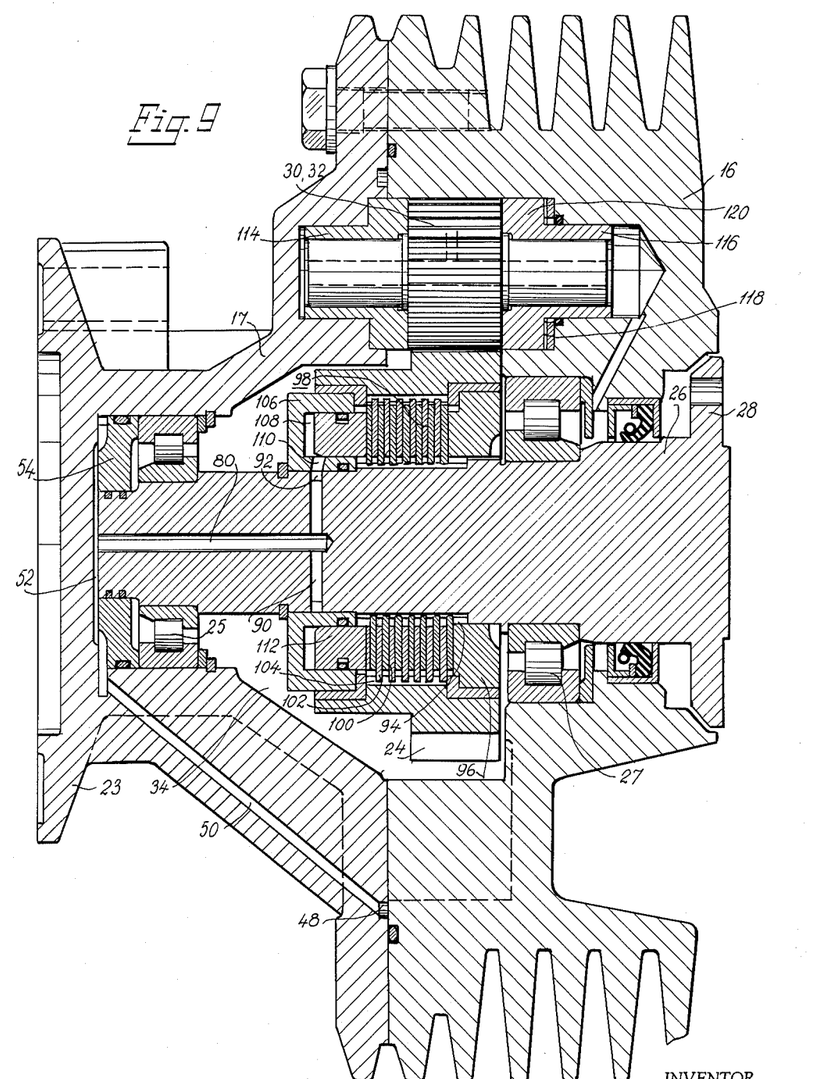
FIG. 9 is a longitudinal section similar to FIG. 2 through a further embodiment.

In FIG. 9 an embodiment is shown similar to but simplified in relation to that shown in FIGS. 2–4. Corresponding parts have been given the same numerals in FIG. 9 as in FIG. 2. The only change in relation to the embodiment of FIG. 2 is that the displaceable valve 68 has been eliminated.

In this way the power transmission has lost the capability of selectively disengaging the shafts from each other when the flange 23 is driving the flange 28 through the power transmission but retained the capacity of disengaging the shafts from each other when the flange 28 is driving the flange 23 through the power transmission. The power transmission as shown in FIG. 9 is thus a freewheel device.

Figure 10:
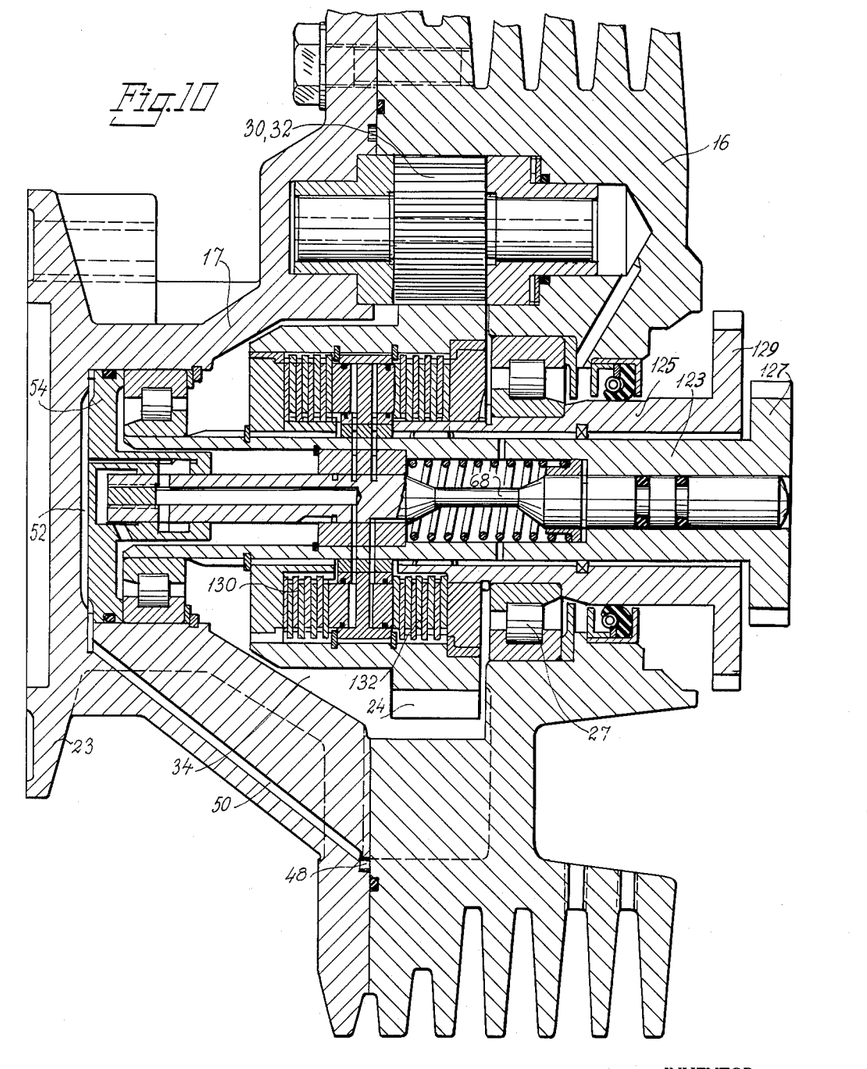
FIG. 10 is a longitudinal sectional view similar to FIG. 2 and showing another form of the invention.

The embodiment shown in FIG. 10 differs from the one shown in FIG. 2 by the following details. The shaft 26 is replaced by two concentric shafts 123, 125 each provided with a gear 127 and 129, respectively. The shaft 123 is connected with the gear 24 by means of a hydraulically operated disk clutch 130 and the shaft 125 is in the same way connected with the gear 24 by means of a disk clutch 132. The pressure fluid from the chamber 52 is directed by a valve 68 to either of said clutches while the other one simultaneously is in connection with the low pressure chamber 34.

Upon disengagement of one of the clutches 130, 132 and engagement of the other one there will be a difference of speed between the engaged shaft 123, 125 and the casing 16, 17. The synchronization work that must be done until the shaft and the casing rotate at the same speed is completely performed by the hydrostatic coupling by rotation of the gear pumps 30, 32 without any slip of the disk clutches 130, 132. In this way a gear change device has been provided, acting by mechanical clutches which do not perform any synchronization work as this work is performed by the hydrostatic coupling in an extremely gentle way and without wear of the clutches.

Figure 11:
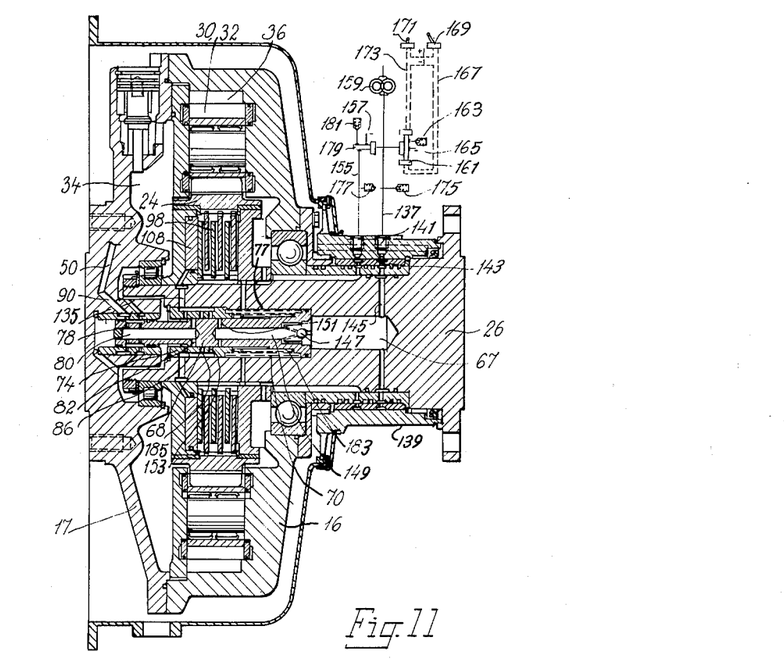
FIG. 11 is a longitudinal section through still a further embodiment and FIG. 12 and FIG. 13 schematically show two different further arrangements of the power transmission according to the invention.
Figure 14:
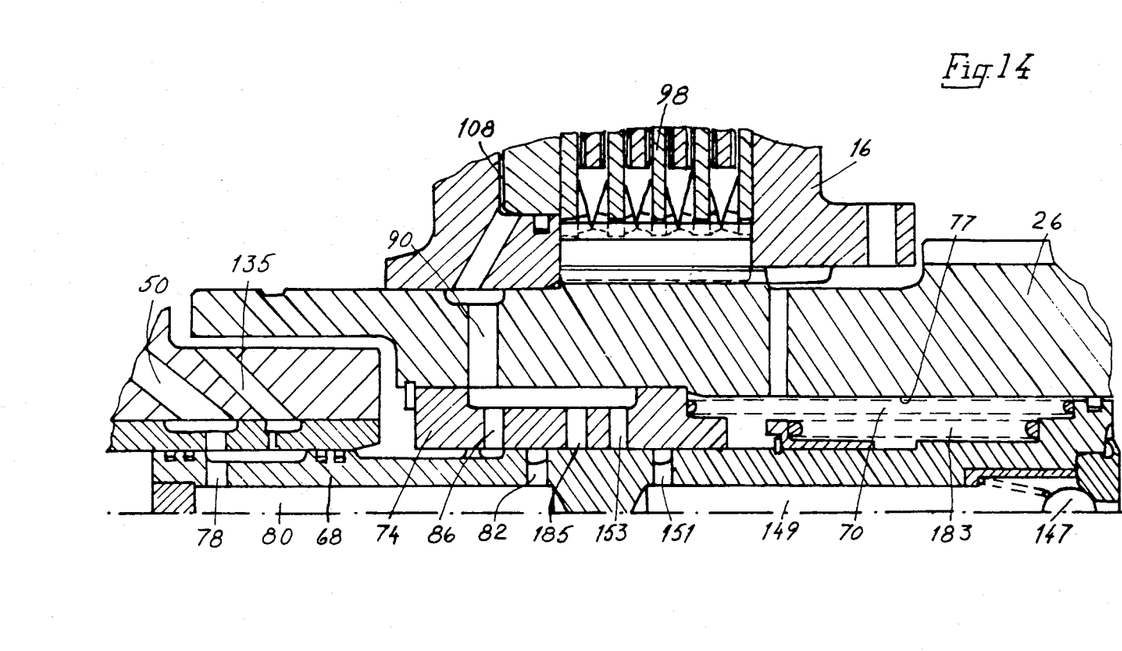
FIG. 14 is a fragmentary sectional view to an enlarged scale showing a portion of the power transmission of FIG. 11.

The embodiment shown in FIGS. 11 and 14 comprises a casing 16, 17 connected with a shaft 26 by pump gears 30, 32 journalled in the casing, a gear 24 intermeshing with one of the pump gears 30, 32, and a hydraulically operated disk clutch 98 between the gear 24 and the shaft 26. The clutch 98 is normally engaged by pressure liquid from the high pressure chamber 36 of the gear pump 30, 32 which chamber communicates by a channel 50 with a valve 68 located in an axial bore 67 of the shaft 26. The valve 68 is provided in one end with an elongated closed chamber 80 which communicates at opposite ends with the outside of the valve 68 by radial bores 78 and 82. The bores 78 are always in communication with the channel 50 and are in clutch disengaging position and also in communication with the low pressure chamber 34 of the hydrostatic coupling through a channel 135. The bores 82 are either sealed by a bushing 74 located between the valve 68 and the shaft 26 or communicate by radial bores 86 in the bushing 74 with radial bores 90 in the shaft 26 and with the operating cylinder 108 of the clutch 98.

The valve 68 simultaneously acts as a piston of a hydraulic servo motor for operation of the valve and control of the power transmission. Pressure liquid is admitted from an external conduit 137 through a bushing 139 with radial bores 141 and an annular groove 143 to a radial bore 145 of the shaft 26 and to the axial bore 67. The valve 68 which is provided with an axial bore 149 separated by a non-return valve 147 will be displaced to the left against the action of the spring 70 until a radial bore 151 of the valve 68 communicates with a radial bore 153 of the bushing 74 which bore 153 permanently communicates with the bores 86 and 90. In this way the clutch 98 is engaged and a sufficiently high pressure is established in the high pressure chamber 36 of the hydrostatic coupling to prevent rotation of the pump gears 30, 32 and the low pressure chamber is at the same time connected by a conduit 155 with an outlet 157.

The pressure liquid for engagement of the clutch is obtained from a permanently acting pump 159 which by means of a slide valve 161 can be connected alternatively with a maximum pressure valve 163 or an outlet 165. Said slide valve 161 is operated by a solenoid in an electric circuit 167 controlled by a switch 169.

A second solenoid is controlled by a second switch 171 in a second electric circuit 173 in such a way that the slide valve 161 is so displaced that the maximum pressure valve 163 as well as the outlet 165 is closed. The pressure in the conduit 137 is then fixed by a second maximum pressure valve 175 adapted for a higher pressure than the maximum pressure valve 163 and a differential pressure valve 177 in a branch conduit to the conduit 155, so that a suitable differential pressure is obtained between the conduits. At the same time the outlet 157 is closed by a slide valve 179 operated by the pressure in the conduit 137 and with a simultaneous opening of a maximum pressure valve 181 in the conduit 155.

When the higher pressure in the conduit 137 is admitted to the bore 67 the valve 68 is displaced further to the left against the action of a second spring 183 until the bore 151 communicates with a radial bore 185 of the bushing 74. In this position of the valve 68 the communication between the bores 82 and 86 is interrupted. At the same time the lower pressure in the conduit 155 is admitted to the low pressure chamber 34.

The embodiment shown in FIG. 11 operates in the following way. When the switch 169 is in the position where the electric circuit 167 is interrupted the slide valve 161 is in the position where it opens the outlet 165. The pressure in the conduit 137 is thus zero and the valve 68 is displaced by the spring 70 to the right hand position where the bore 82, as well as the bore 151 is sealed by the bushing 74. No pressure fluid can thus be admitted to the clutch 98 and the clutch device is, therefore, disengaged. When the switch 169 is brought to the position in which the electric circuit 167 is closed, the slide valve 161 is moved to the position where it closes the outlet 165, but connects the conduit 137 to the maximum pressure valve 163. The pressure in the conduit 137 increases but not enough to replace the slide valve 179 which is still in a position where the outlet 157 is open.

The pressure in the conduit 137 acts upon the valve 68 in such a way that the bore 151 communicates with the bore 153 and the bore 82 communicates with the bore 86. In this way pressure liquid is admitted to the clutch 98 so that it will be engaged and to the high pressure chamber 36 so that also the hydrostatic coupling will be engaged. The power transmission as a whole is thus operable.

When the switch 171 closes the electric circuit 173 the slide valve 161 is displaced to the position where it closes the outlet 165 as well as the maximum pressure valve 163. The pressure in the conduit 137 increases so that the slide valve 179 closes the outlet 157 and the pressure in the conduit 155 through the differential pressure valve 177 increases to the valve fixed by the maximum pressure valve 181. When the pressure in the conduit 137 is admitted to the bore 67 the valve 68 is displaced to the position where the bore 151 communicates with the bore 185 and where the communication between the bores 82 and 86 is interrupted. High pressure liquid is in this way admitted to the clutch 98 which on this account is held engaged. On the other hand no high pressure liquid is admitted to the high pressure chamber 36. Pressure liquid from the conduit 155 is at the same time admitted to the low pressure chamber 34 so that upon reverse drive the mechanical clutch 98 as well as the hydrostatic coupling is engaged and the free-wheel affect of the power transmission occuring under other conditions of operation is eliminated.

Figure 12:
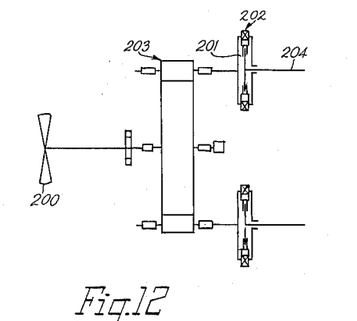

FIG. 12 shows the adaptation of the transmission of this invention to a ship having two engines, not shown, and one propeller 200 in which the casing 201 of the hydrostatic coupling 202 is connected with the reduction gear 203 and the inner shaft 204 is connected with the engine.

Figure 13:
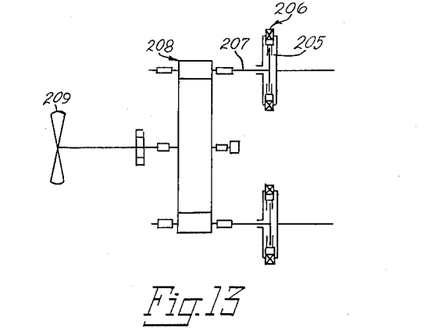

FIG. 13 shows another adaptation where the casing 205 of the hydrostatic coupling 206 is connected with the engine, not shown, and the inner shaft 207 is connected with the reduction gear 208 to drive the propeller 209.

These two figures thus show that either of the shafts of the power transmission may be utilized as the driving shaft and that the determining factor is how the pumps are provided in the casing.

It will be obvious to those skilled in the art that various changes may be made in the invention with departing from the spirit and scope thereof and therefore the invention is not limited by that which is shown in the drawings and described in the specification, but only as indicated in the appended claims.

I claim:

1. A power transmission mechanism for connection of power input and power output shafts, said mechanism including a hydrostatic coupling having a first member non-rotatably connected to said input shaft, a second member and at least one pump element mounted in one of said members and drivingly connecting said two members and developing pressure fluid on the pressure outlet side thereof, a mechanical clutch having a first member non-rotatably connected to said second member of the hydrostatic coupling, a second member non-rotatably connected with said output shaft, and a servo motor operably connected to said clutch for engagement of said clutch, said mechanism further including conduit means providing direct communication between said pressure outlet side of the coupling and said servo motor, whereby said first and second clutch members are drivingly engaged solely by fluid pressure developed by said coupling.

2. A power transmission mechanism as defined in claim 1, in which said first member of the hydrostatic coupling comprises a rotatable casing, a plurality of said pump elements comprising separate gears mounted in said casing, and said second member of the coupling comprising a centrally disposed gear in constant intermesh with each of said separate gear.

3. A power transmission mechanism as defined in claim 1, including selectively operable valve means located in said conduit means and further conduit means providing communication between the suction inlet side of the coupling and said servo motor, whereby when said valve means are in one position said servo motor communicates with the pressure outlet side of the coupling and the clutch is engaged and when said valve means are in a second position said servo motor communicates with the suction inlet side of the coupling and the clutch is disengaged.

4. Power transmission mechanism according to claim 1, in which the mechanical clutch is of the friction type.

5. Power transmission mechanism according to claim 1, in which the hydrostatic coupling is provided with a maximum pressure valve.

6. Power transmission mechanism according to claim 3 and provided with at least two selectively operated clutches and at least two output shafts, the number of output shafts corresponding to the number of clutches.

7. Power transmission mechanism according to claim 3, in which said valve means is coaxial with the axis of the clutch and is axially slidable.

8. Power transmission mechanism according to claim 3, in which means is provided for selectively actuating said valve means.

9. Power transmission mechanism according to claim 8, in which the said actuating means is operable in response to temperature conditions.

10. Power transmission mechanism according to claim 8, in which said actuating means is a solenoid.

11. Power transmission mechanism according to claim 8, in which said actuating means is a hydraulically operated piston.

12. Power transmission mechanism according to claim 11, in which the piston is directly connected with the valve.

13. Power transmission mechanism according to claim 11, in which the piston is operable in two steps by means of different pressures of the operating fluid.

14. Power transmission mechanism 13, in which at the step corresponding to the higher fluid pressure the connection of the servo motor of the clutch with the pressure side of the hydrostatic coupling is adapted to be interrupted by the simultaneous supply of high pressure liquid to the servo motor as well as to the suction side of the hydrostatic coupling.

15. Power transmission mechanism according to claim 8, in which said actuating means is a thermostat disposed in the power transmission and operable in response to the temperature in said power transmission.

16. Power transmission mechanism as defined in claim 8, in which said actuating means is operable in response to pressure conditions.

References Cited by the Examiner

UNITED STATES PATENTS

| | | | |
|---|---|---|---|
| 1,136,168 | 4/15 | Rich | 192—57 |
| 1,689,244 | 10/28 | Klimek | 192—57 X |
| 2,065,737 | 12/36 | Ramsey | 192—61 |
| 2,435,244 | 2/48 | Stephens | 192—61 |
| 2,699,240 | 1/55 | Hilb | 192—61 X |
| 2,876,881 | 3/59 | Parrett. | |
| 3,020,992 | 2/62 | Gunn | 192—61 |

DAVID J. WILLIAMOWSKY, *Primary Examiner.*

THOMAS J. HICKEY, ROBERT C. RIORDON, *Examiners.*